May 10, 1966 J. PETRY 3,250,342
NOISE-SUPPRESSING DEVICE FOR USE WITH GAS PRESSURE REGULATORS
Filed April 13, 1964
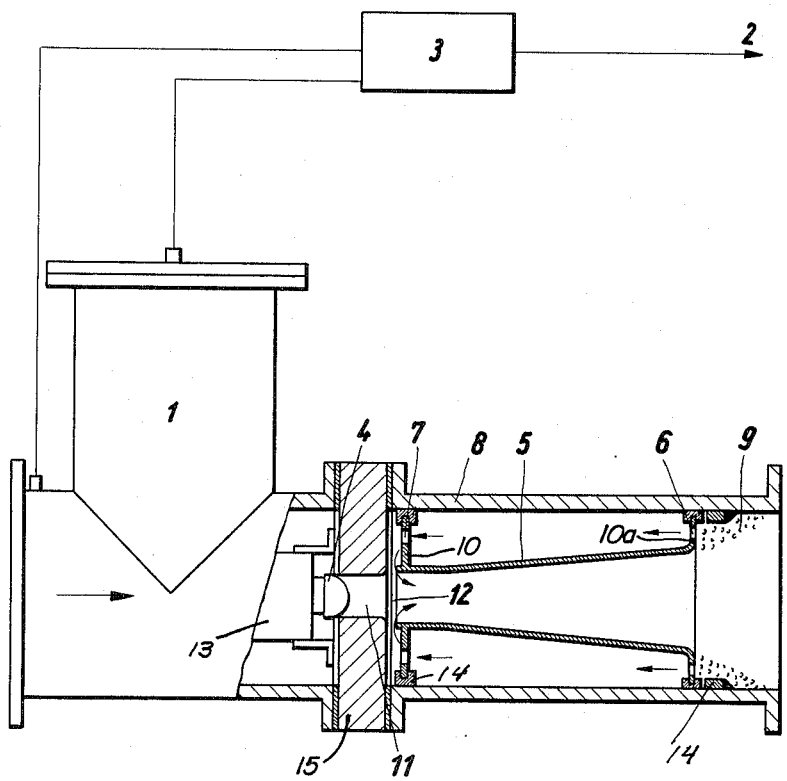
Inventor:
JOHANNES PETRY
by Hane and Nydink
ATTORNEYS

3,250,342
NOISE-SUPPRESSING DEVICE FOR USE WITH GAS PRESSURE REGULATORS

Johannes Petry, Auf der Bunte 11, Kassel, Germany
Filed Apr. 13, 1964, Ser. No. 358,995
Claims priority, application Germany, Apr. 13, 1963,
P 31,575
4 Claims. (Cl. 181—56)

The present invention relates to gas pressure regulators in which a high pressure drop occurs between the inlet and the outlet sides of the regulator. The valve opening in the regulator of this type has a diameter smaller than that of the guide duct for the gas within the regulator. As a result, the flow velocity of the gas is greatly increased, whereby eddy flows occur behind the valve opening as seen in the direction of the flow, causing a noisy operation of the regulator. In fact, the noise caused by such regulators is often so powerful that it is difficut to work in the vicinity thereof.

It has been attempted to damp the noise by providing on the outlet side of the regulator a tube filled with coarse material, such as stones. Such tube has a baffling or muffling action by which the turbulent or eddying flows are captured. As a result, a throttling of the propagation of the vibrations in the duct is achieved, but at the expense of a considerable loss in pressure. In any event, the cause of the development of the noise, and with it the basic source thereof, are not eliminated.

It is a broad object of the invention to provide a novel and improved noise-suppressing device for use with gas regulators of the general kind above referred to, which device suppresses the noise generated at the outlet of the regulator by gradually expanding the discharged gas flow, thereby reducing the formation of eddy flows and thus the noise caused by such flows.

The afore-described object, and other objects which will be pointed out hereinafter, are attained by providing a gas expansion duct in which the cross sectional area available to the gas flow is gradually increased from the inlet end of the expansion duct adjacent the outlet side of the regulator toward the discharge end of the expansion duct.

In the single figure of the accompanying drawing a preferred embodiment of the invention is shown by way of illustration, and not by way of limitation.

Referring now to the figure in detail, there are shown a gas pressure regulator 1 and its control means 2 and 3 in diagrammatic form. The regulator as such should be visualized as being conventional so that a detailed illustration and description thereof are unnecessary for the understanding of the invention.

The regulator discharges the gas flow through a valve opening 11 which is formed in a wall member 15 and communicates on one side with a duct 13 of greater diameter. The communication between duct 13 and valve opening 11 is controlled by a valve body 4. A description of the control of the valve body is not essential for the understanding of the invention. An expansion duct 5, shown in the form of a conical tube, is disposed closely adjacent to the opposite end of valve opening 11, so that the narrow end of duct 5 faces opening 11 separated therefrom by a gap 12. The duct is mounted within a generally cylindrical jacket 8 and is secured therein by mounting flanges 10 and 10a. Several perforations 7 are provided in mounting flange 10 which constitutes a partition wall. The mounting flange 10a at the wide end of duct 5 is similarly perforated at 6, but flange 10a may also be solid, and perforations leading into the space between duct 5 and jacket 8 may be provided in the latter. Cushions 14 made of a suitable vibration-damping material, such as rubber, are preferably provided between the mounting flanges and the jacket 8 to suppress oscillations or vibrations of duct 5.

As is evident, the gas flow entering duct 5 will be gradually expanded within the duct, thereby suppressing or at least reducing the formation of noise-causing eddy flows in the stream of gas.

Minor turbulent flows may be formed at the outlet end of duct 5, as is indicated at 9. The volume of gas in area 9 is sucked back through perforations 6 and into the space defined by duct 5 and jacket 8 reintroduced into the gas flow through perforations 7 and the narrow gap 12. The formation of the just-described gas flow not only suppresses noise, but also produces heat instead of noise, and constitutes in effect a sound-insulating layer between expansion duct 5 and jacket 8.

As is evident, substantially the same effect is attained when the perforations 6 are provided directly in the wall of jacket 8, rather than in mounting flange 10a.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for suppressing noise at the outlet end of a gas pressure regulator, said device comprising a wall member including a gas outlet opening for the regulator, a conical gas expansion duct disposed coaxially with said opening, the narrow end of the duct facing said opening but being separated therefrom by a gap, the narrow end of the duct constituting the gas inlet end thereof and the wide end of the duct the gas outlet end thereof, a tubular jacket encompassing the duct and being secured at one end to said wall member, the other jacket end being open, and a partition wall at the inlet end of the duct securing said one jacket end thereto, the outlet end of the duct being secured to the jacket in sealing connection therewith, whereby a first closed chamber is defined by the partition wall and said wall member and a second closed chamber by the partition wall and the outlet end of the duct, said partition wall including an aperture connecting the two chambers, a second aperture being provided at the outlet end of the duct to form a passage for a back flow of gas from said outlet end into the first chamber.

2. A device for suppressing noise at the outlet end of a gas pressure regulator, said device comprising a wall member including a gas outlet opening for the regulator, a conical gas expansion duct disposed coaxially with said opening, the narrow end of the duct facing said opening but being separated therefrom by a gap, the narrow end of the duct constituting the gas inlet end thereof and the wide end of the duct the gas outlet end thereof, a tubular jacket encompassing the duct and being secured at one end to said wall member, the other jacket end being open, circular mounting flanges at the inlet and the outlet end, respectively, of the duct securing both said ends of the duct to the jacket to define a closed annular chamber encompassing the duct and a closed annular chamber including said gap, each of said flanges including at least one aperture to provide a passage for a back flow of gas from the outlet end of the duct through said chambers to the gap.

3. A device according to claim 2, wherein said jacket is axially extended beyond the outlet end of the duct.

4. A device according to claim 1, wherein vibration-damping bushings are interposed between said mounting flanges and said duct.

(References on following page)

References Cited by the Examiner

UNITED STATES PATENTS

| | | | |
|---|---|---|---|
| 1,739,161 | 12/1929 | McKee | 138—44 X |
| 2,036,138 | 3/1936 | Haas | 181—44 |
| 2,047,775 | 7/1936 | Gunn | 181—36 |
| 2,185,713 | 1/1940 | Spence. | |
| 2,531,139 | 11/1950 | Lilly et al. | |
| 2,841,232 | 7/1958 | Loeffler. | |
| 2,904,076 | 9/1959 | Engel et al. | |
| 3,018,799 | 1/1962 | Volkmann et al. | 138—44 X |

FOREIGN PATENTS 557,311  8/1932  Germany.

LEO SMILOW, *Primary Examiner*.